US007798285B2

(12) United States Patent
Chiou et al.

(10) Patent No.: US 7,798,285 B2
(45) Date of Patent: Sep. 21, 2010

(54) ACOUSTIC BARREL FOR AIRCRAFT ENGINE NACELLE INCLUDING CRACK AND DELAMINATION STOPPERS

(75) Inventors: Song Chiou, Cerritos, CA (US); Jia Yu, San Diego, CA (US); Claude Hubert, Riverside, CA (US); Michael Layland, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 12/271,189

(22) Filed: Nov. 14, 2008

(65) Prior Publication Data
US 2010/0122868 A1 May 20, 2010

(51) Int. Cl.
| | |
|---|---|
| F02K 1/00 | (2006.01) |
| F02K 1/82 | (2006.01) |
| F01D 21/00 | (2006.01) |
| F01D 25/04 | (2006.01) |
| F02B 77/13 | (2006.01) |
| F01N 1/24 | (2006.01) |
| E04B 1/82 | (2006.01) |
| B64C 1/06 | (2006.01) |
| B64C 1/12 | (2006.01) |
| B64D 33/02 | (2006.01) |
| B64F 1/26 | (2006.01) |

(52) U.S. Cl. .................... 181/213; 181/204; 181/210; 181/214; 181/222; 181/286; 181/290; 181/292; 181/293; 244/53 B; 244/131; 244/132; 415/9; 415/119

(58) Field of Classification Search ................. 181/213, 181/214, 210, 204, 222, 286, 290, 292, 293; 244/53 B, 131, 132; 415/9, 119
See application file for complete search history.

(56) References Cited

U.S. PATENT DOCUMENTS 3,297,238 A * 1/1967 Sherman ...................... 60/269

(Continued)

FOREIGN PATENT DOCUMENTS

EP    1 880 941 A2    1/2008

(Continued)

OTHER PUBLICATIONS

Extended European Search Report (EP Appln. No. 09 01 4080) mailed Mar. 23, 2010.

*Primary Examiner*—Jeffrey Donels
*Assistant Examiner*—Christina Russell
(74) *Attorney, Agent, or Firm*—Womble Carlyle Sandridge & Rice, PLLC

(57) ABSTRACT

An acoustic inner barrel for an aircraft engine nacelle inlet is constructed from a composite material and is formed as a single, 360-degree annular segment. The barrel includes an inner skin, an outer skin, a cellular core disposed between the inner skin and the outer skin, and at least one crack and delamination stopper extending radially from the inner skin to the outer skin.

13 Claims, 7 Drawing Sheets

U.S. PATENT DOCUMENTS

| | | | |
|---|---|---|---|
| 4,150,732 A * | 4/1979 | Hoch et al. | 181/213 |
| 4,215,536 A * | 8/1980 | Rudolph | 60/262 |
| 4,416,349 A * | 11/1983 | Jacobs | 181/208 |
| 4,449,607 A * | 5/1984 | Forestier et al. | 181/213 |
| 4,452,563 A * | 6/1984 | Belanger et al. | 415/9 |
| 4,452,565 A * | 6/1984 | Monhardt et al. | 415/9 |
| 4,751,979 A * | 6/1988 | Wiseman | 181/213 |
| 4,944,362 A * | 7/1990 | Motsinger et al. | 181/213 |
| 4,979,587 A * | 12/1990 | Hirt et al. | 181/213 |
| 5,000,399 A * | 3/1991 | Readnour et al. | 244/53 B |
| 5,297,760 A * | 3/1994 | Hart-Smith | 244/132 |
| 5,543,198 A * | 8/1996 | Wilson | 428/116 |
| 5,592,813 A * | 1/1997 | Webb | 60/226.2 |
| 5,609,313 A * | 3/1997 | Cole et al. | 244/54 |
| 5,658,024 A * | 8/1997 | Bachmann et al. | 285/299 |
| 5,941,061 A * | 8/1999 | Sherry et al. | 60/798 |
| 6,123,170 A * | 9/2000 | Porte et al. | 181/214 |
| 6,328,258 B1 * | 12/2001 | Porte | 244/53 B |
| 6,328,261 B1 * | 12/2001 | Wollaston et al. | 244/132 |
| 6,340,135 B1 * | 1/2002 | Barton | 244/53 B |
| 6,530,221 B1 * | 3/2003 | Sattinger et al. | 60/725 |
| 6,761,245 B2 * | 7/2004 | Porte | 181/210 |
| 6,857,669 B2 * | 2/2005 | Porte et al. | 285/368 |
| 7,021,856 B2 * | 4/2006 | Assler et al. | 403/408.1 |
| 7,296,655 B2 * | 11/2007 | Costa et al. | 181/210 |
| 7,328,771 B2 * | 2/2008 | Costa et al. | 181/214 |
| 7,334,393 B2 * | 2/2008 | Porte | 60/226.1 |
| 7,383,679 B2 * | 6/2008 | Porte et al. | 60/226.1 |
| 7,503,425 B2 * | 3/2009 | Strunk | 181/214 |
| 2004/0045765 A1 * | 3/2004 | Porte | 181/210 |
| 2007/0062022 A1 * | 3/2007 | Douglas et al. | 29/527.1 |
| 2008/0017442 A1 * | 1/2008 | Douglas | 181/213 |
| 2008/0179448 A1 * | 7/2008 | Layland et al. | 244/1 N |

FOREIGN PATENT DOCUMENTS

| | | |
|---|---|---|
| GB | 2 273 131 A | 6/1994 |
| WO | WO 92/00183 A1 | 1/1992 |

* cited by examiner

ACOUSTIC BARREL FOR AIRCRAFT ENGINE NACELLE INCLUDING CRACK AND DELAMINATION STOPPERS

BACKGROUND

When a "blade-out" event occurs in an aircraft engine, it is critical that the aircraft have "fly-home" capability (i.e., the ability to return safely to the ground under FAA rules). The ability of the engine nacelle to tolerate damage and maintain its structural integrity during a blade-out event is critical to the fly-home capability of an aircraft.

Some known engine nacelle inlets include acoustic inner barrels composed of multiple annular segments secured by splice joints provided with fasteners. In addition to fastening adjacent annular segments of the acoustic inner barrel, the splice joints function to limit the propagation of damage through the barrel. Thus, the "damage-stopping" splice joints help preserve the structural integrity of the acoustic inner barrel, and therefore, the entire nacelle, during a blade-out event. Examples of multi-piece acoustic inner barrels are disclosed in U.S. Published Application No. 2008/0017442, which is assigned to Rohr, Inc.

In some modern aircraft, the engine nacelle inlet includes a 360-degree, one-piece (i.e., formed as a single annular segment) acoustic inner barrel composed of a cellular core or core assembly (SDOF or DDOF core blanket) disposed between inner and outer skins. The cellular core may be constructed of either a metallic or a composite material, such as graphite-epoxy or the like, and may include an inner array of cells and an outer array of cells separated by a septum. The inner and outer skins are also made of the composite material. As a result of their monolithic design, one-piece acoustic inner barrels lack the damage-stopping splice joints of multi-segment acoustic barrels. Therefore, providing sufficient tolerance to damage during a blade-out event is a primary concern with 360-degree, one-piece acoustic inner barrels.

It is desirable to provide a 360-degree, one-piece acoustic inner barrel for an aircraft engine nacelle that exhibits improved cracking, disbond, and delamination resistance, to mitigate a blade-out event.

SUMMARY

The disclosure concerns a 360-degree, one-piece acoustic inner barrel for an aircraft engine nacelle inlet, and a method for constructing such a barrel. The inner barrel is designed to limit cracking, disbond, and delamination of the barrel during a blade-out event, thereby improving the fly-home capability of an aircraft having such an inner barrel.

According to certain embodiments, the acoustic inner barrel may include: an inner annular inner skin; an annular outer skin; an annular acoustic cellular core assembly disposed between the inner skin and the outer skin; and at least two reinforcement members extending radially from the inner skin, through the acoustic cellular core, and to the outer skin. The inner skin, outer skin, acoustic cellular core assembly and the at least two or more reinforcement members are bonded together to form a 360-degree, one-piece annular structure and still maintain acoustic smoothness requirements of the barrel.

The reinforcement members may each have either a Z-shaped cross section, a C-shaped cross section or an I-shaped cross section in the axial direction of the barrel The reinforcement member, which is joined to the inner skin and outer skin, may be perforated locally so as not to detrimentally affect the acoustic performance of the barrel. The reinforcement members may each have a first end segment secured between the acoustic cellular core and an innermost surface of the outer skin, and a second end segment secured between opposing layers of the inner skin, such that the attachment between the reinforcement members and the inner skin is stronger than the attachment between the reinforcement members and the outer skin.

A method of constructing such an acoustic inner barrel may include: providing an annular inner skin comprising a plurality of layers, an annular outer skin, a cellular core assembly, and at least two reinforcement members; bonding the at least two reinforcement members into the inner skin; bonding the cellular core to the at least two reinforcement members and the inner skin such that the at least two reinforcement members extend transversely through the cellular core; and bonding the outer skin.

Additional features and advantages of the invention are provided in the following detailed description and appended drawings.

DETAILED DESCRIPTION OF THE INVENTION

Figure 1:
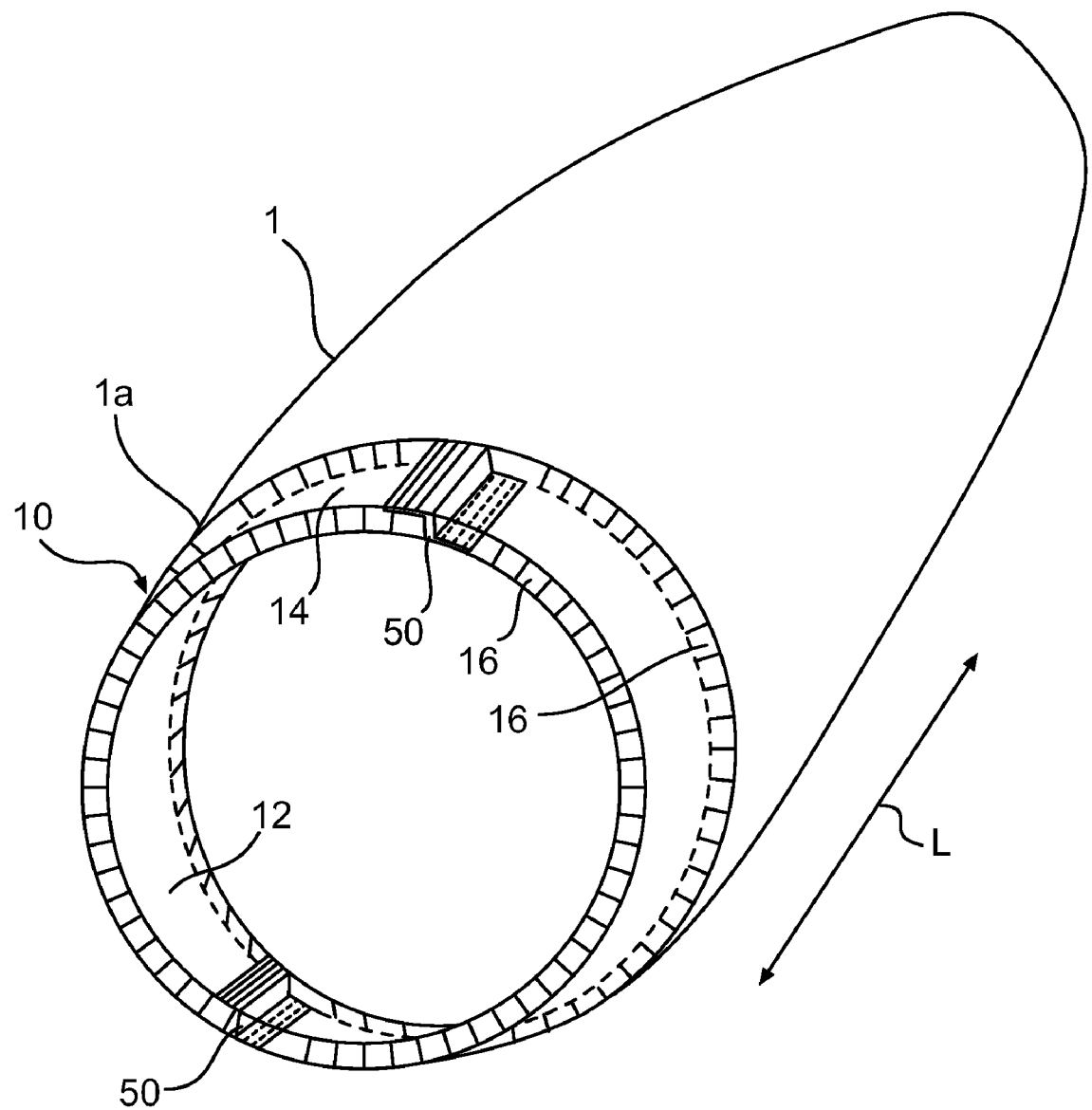
FIG. 1 shows an aircraft engine nacelle having an inlet including an acoustic inner barrel according to one embodiment of the invention.
Figure 2:
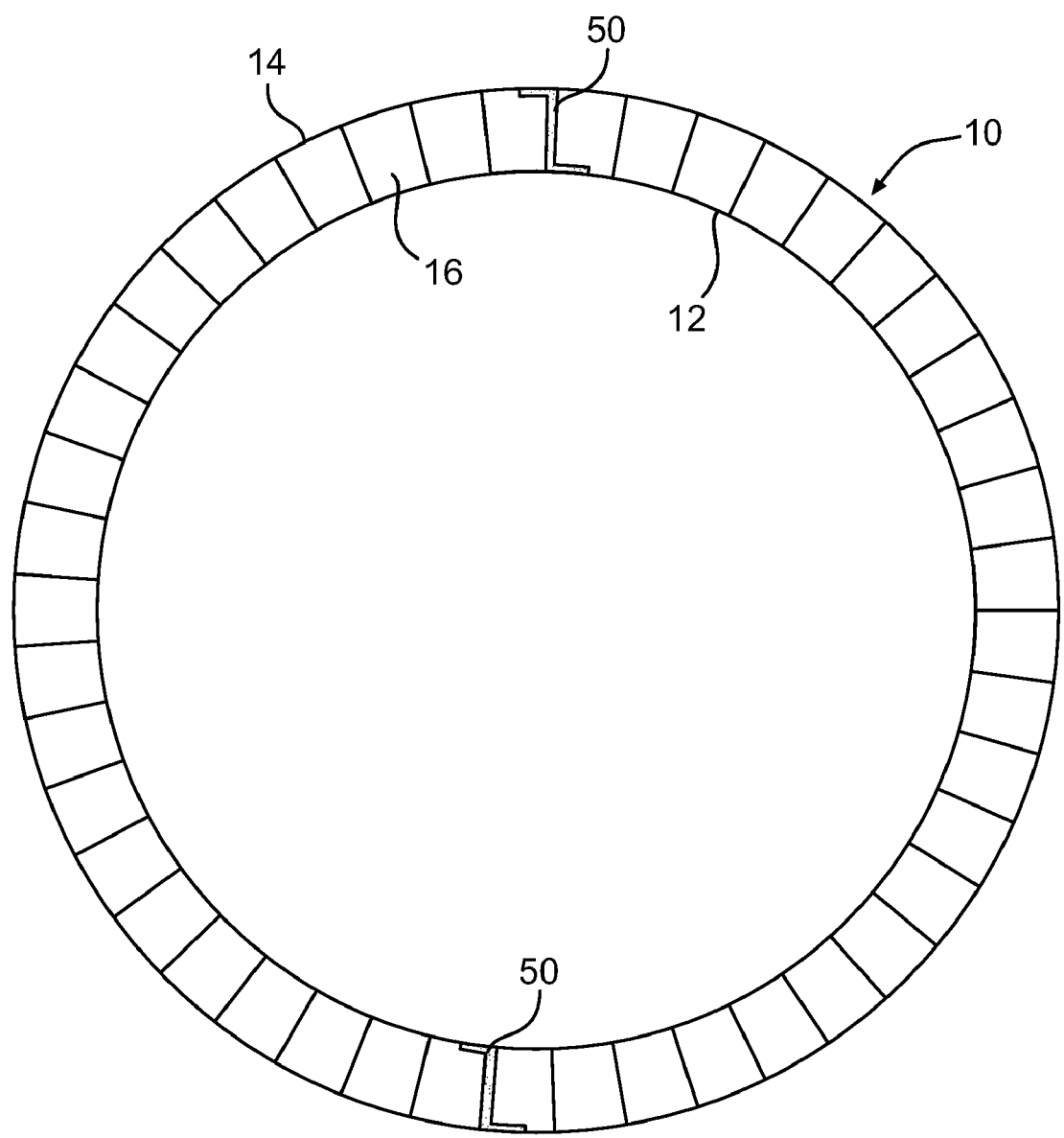
FIG. 2 is a cross-sectional view of the acoustic inner barrel of FIG. 1.

FIG. 1 shows an aircraft engine nacelle 1 including an acoustic inner barrel 10 at its inlet 1a, according to one embodiment of the invention. As shown in FIGS. 1 and 2, the barrel 10 has a 360-degree, one-piece annular construction. The barrel 10 includes an annular, perforated inner face sheet or inner skin 12, an annular, imperforate outer face sheet or outer skin 14 radially spaced from the inner skin 12, and an acoustic cellular core 16 disposed between the inner skin 12 and the outer skin 14. The term "annular" includes constructions having varying diameters and shapes along the length L (FIG. 1) of the nacelle 1, and is not intended to be limited to right cylinders. The inner skin 12, outer skin 14 and cellular core 16 may be constructed of a composite material, such as graphite-epoxy, or the like. The inner skin 12 and outer skin 14 are bonded to the core 16 by an adhesive such as Henkel Epoxy Adhesive EA 9258.1, or another adhesive material having comparable peel and shear strengths, so as to have a 360-degree, one-piece construction. The core 16 may have a single-degree-of-freedom arrangement, a double-degree-of-freedom or a different multiple-degree-of-freedom arrangement of a type known to persons of ordinary skill in the art.

As shown in FIGS. 1 and 2, the barrel 10 includes two crack and delamination stoppers, or reinforcement members 50 disposed approximately 180 degrees apart around the circumference of the barrel 10. The reinforcement members 50 extend radially from the inner skin 12, through the core 16 and to the outer skin 14. The reinforcement members 50 reinforce the skins 12, 14 and the core 16, and serve to limit delamination and cracking of the barrel 10 during accidents, such as a blade-out events, that may otherwise inflict structural damage on the nacelle 1. The reinforcement members 50 may be made of a suitably strong, lightweight material. A composite material, such as graphite-epoxy, is preferable, although metallic materials, such as aluminum or titanium, may also be used. Although two reinforcement members 50 are shown, any number and spacing of reinforcement members may be used, depending on structural needs. Where multiple reinforcement members 50 are employed, it is preferable that the reinforcement members 50 be uniformly spaced around the circumference of the barrel 10. For example, three reinforcement members 50 may be provided at approximately 120-degree spacing around the circumference of the barrel 10, or four reinforcement members 50 may be provided at approximately 90-degree spacing around the circumference of the barrel 10. It is also possible to place the reinforcement members 50 at non-uniform spacings around the barrel 10, to accommodate non-uniform structural requirements of the barrel 10.

Figure 3A:
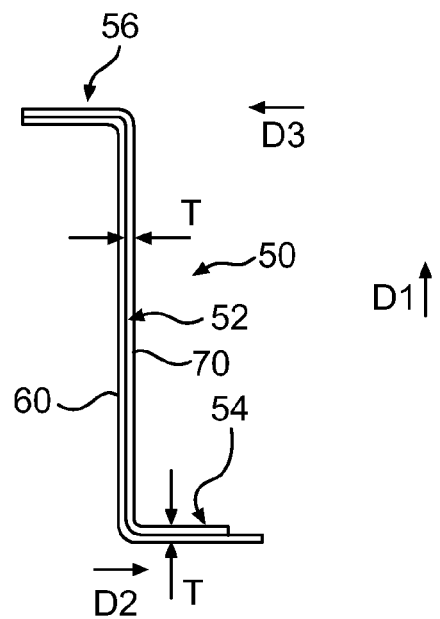
FIG. 3A is an enlarged view of a portion of the acoustic inner barrel of FIG. 2.
Figure 3B:
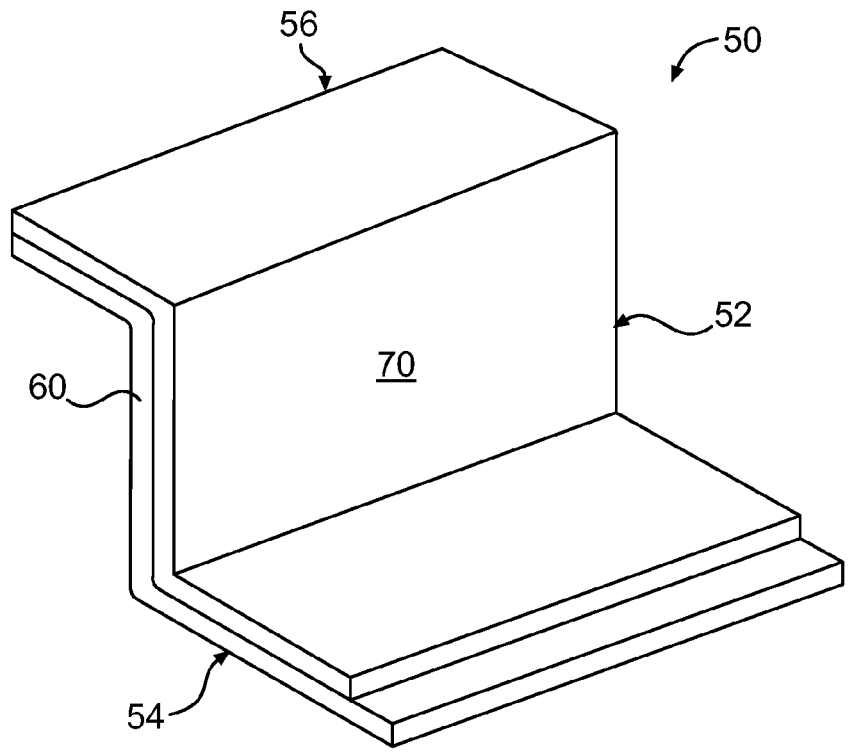
FIG. 3B is a perspective view of a crack and delamination stopper for the inner barrel of FIGS. 2 and 3A.

Referring to FIGS. 3A and 3B, each reinforcement member 50 has an essentially Z-shaped cross-section in the axial direction (into the page) of the barrel 10, and includes a central segment 52 extending in a first direction D1, a first end segment 54 extending from a first end of the central segment 52 in a second direction D2 transversely (preferably, perpendicularly) to the first direction D1, and a second end segment 56 extending from a second end of the central segment 52 in a third direction D3 opposite the second direction D2. Each reinforcement member 50 is preferably constructed from two or more similarly shaped plies 60, 70 that are bonded together such that each channel member essentially forms a half of the reinforcement member 50. According to a preferred embodiment, the reinforcement member 50 is provided as a pre-cured composite body, wherein the plies 60, 70 are constructed of a composite material such as graphite-epoxy and bonded together by an adhesive such as 3M Scotch-Weld® Epoxy Adhesive EC-2216 B/A, or another adhesive material having comparable peel and shear strengths.

As illustrated in FIG. 3A, the ply 60 may extend beyond the ply 70 in the direction D2 at the first end segment 54 in order to promote more secure attachment of the reinforcement member 50 to the inner skin 12 the barrel 10, as will be described in more detail later. After installation in the barrel 10, the first end segment 54 is perforated (FIG. 4) so as not to adversely impact the acoustic performance of the barrel 10.

The reinforcement members 50 may generally have a thickness T (in the direction perpendicular to the length of a respective portion 52/54/56) of about 0.030-0.050 inches (0.076-0.127 cm). According to an exemplary embodiment, each ply 60, 70 is about 0.0075 inches (0.019 cm) thick. However, the thickness of the reinforcement members 50 may vary as required in a given application. Furthermore, according to an exemplary embodiment, the axial length of the reinforcement members 50 (in the direction L shown in FIG. 1) is approximately equal to the axial length of the core 16.

Although the reinforcement members 50 are shown and described as formed from two bonded plies 60, 70, such a construction is not required. The reinforcement members may be formed from a greater number of plies, the plies may be joined by means other than bonding, or the reinforcement members may have unitary one-piece construction.

Figure 4:
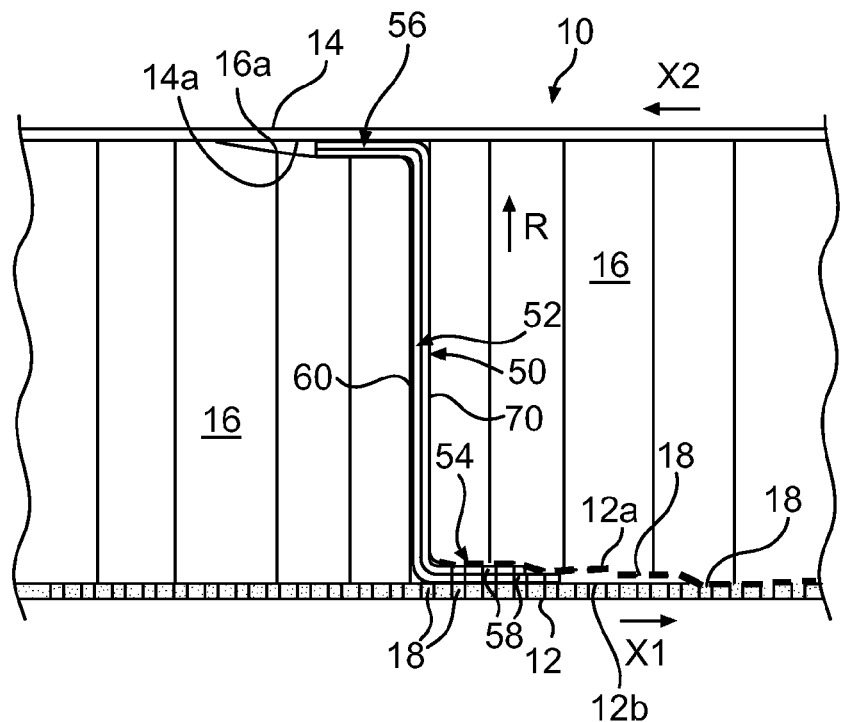
FIG. 4 is a cross-sectional view of the crack and delamination stopper of FIG. 3B.

FIG. 4 illustrates in detail the construction of the barrel 10. As shown in FIG. 3A, the central segment 52 of the channel member 50 extends radially in the direction R through the core 16 of the barrel 10, the first end segment 54 of the reinforcement member 50 extends substantially parallel to the inner skin 12 in a first direction X1 and the second end segment 56 of the reinforcement member 50 extends substantially parallel to the outer skin 14 in a second direction X2. The first end segment 54 is positioned between layers 12a, 12b of the inner skin 12. The second end segment 56 is positioned between the radially outermost surface 16a of the core 16 and the radially innermost surface 14a of the outer skin 14.

The reinforcement member 50 is bonded to opposing surfaces of the barrel 10. Specifically, the central segment 52 is bonded to circumferentially opposing surfaces of the core 16, the first end segment 54 is bonded to the surrounding layers 12a, 12b of the inner skin 12, and the second end segment 56 is bonded to the radially opposing outer skin 14 and the outermost surface of the core 16. Because the ply 60 is longer than the ply 70 in the direction D2 at the first end segment 54, the surface area of the first end segment 54 is increased, thereby providing a larger bonding surface area between the first end segment 54 and the inner skin 12. The reinforcement member 50 may be bonded to the adjacent surfaces of the barrel 10 by an adhesive such as 3M Scotch-Weld® Epoxy Adhesive EC-2216 B/A, or another adhesive material having comparable peel and shear strengths.

It is noted that, in the embodiment shown in FIG. 4, the second end segment 56 is not positioned between opposing individual layers (not shown) of the outer skin 14, so that the bond between the first end segment 54 and the inner skin 12 is stronger than the bond between the second end segment 56 and the outer skin 14. Although it is possible for the second end segment 56 to be positioned between individual layers (not shown) of the outer skin 14, such a configuration is less desirable than the configuration shown in FIG. 4. It is desirable that the bonds between the reinforcement members 50 and the inner skin 12 be stronger than the bonds between the reinforcement members 50 and the outer skin 14, because such an arrangement provides optimum failure resistance characteristics. In a blade-out event, the engine fan blade will first strike the inner skin 12, so the inner skin 12 will be the first part of the barrel to take damage. When the bonds between the reinforcement members 50 and the inner skin 12 are stronger than the bonds between the reinforcement members 50 and the outer skin 14, the flow of energy from a blade-out event will follow a path extending from the inner skin 12 through a reinforcement member 50, and then into the outer skin 14. Thus, less of the energy from a blade-out event is likely to flow through a path extending around the circumference barrel 10. As a result, damage from a blade-out event is more likely to be circumferentially localized at areas of impact, and is less likely to propagate circumferentially through the barrel 10, thereby increasing the likelihood of a greater portion of the barrel remaining intact.

As shown in FIG. 4, and as well known in the art, the inner skin 12 includes perforations 18 that extend through the skin 12 to provide a desired flow of sound waves into the core 16. According to an embodiment, the first end segment 54 of the reinforcement member 50 preferably includes perforations 58 that are substantially radially aligned with the perforations 18 so as to not detrimentally affect the flow of sound waves through the perforations 18 into the core 16.

Figure 5:
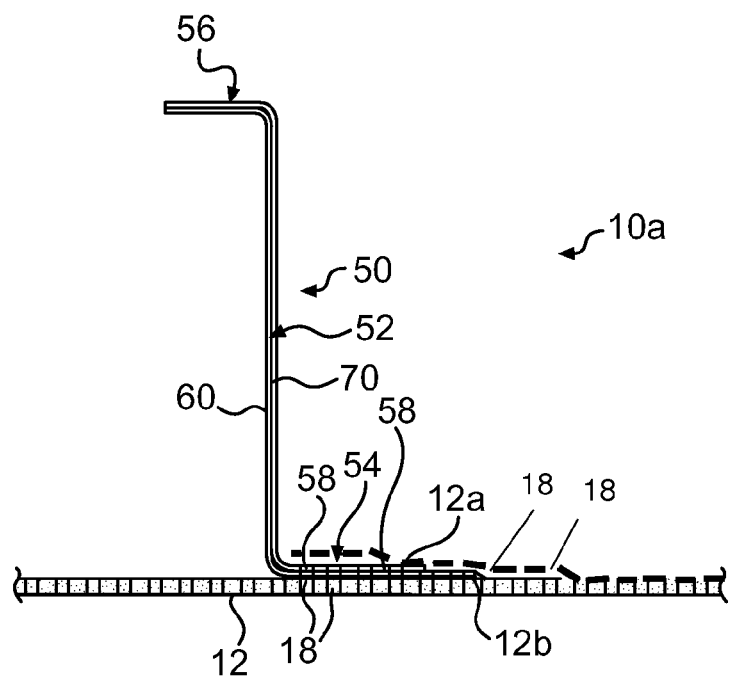
FIG. 5 illustrates an intermediate sub-assembly during the construction of the inner barrel of FIGS. 2 and 3A.

A method of assembling the barrel 10 will now be described with reference to FIGS. 4 and 5. As shown in FIG. 5, a reinforcement member 50 is integrated into the inner skin 12 by positioning the first end segment 54 between the inner skin layers 12a, 12b such that the layers 12a, 12b lie over the first end segment 54, and then applying adhesive to adjacent surfaces of the first end segment 54 and the inner skin layers 12a and 12b. One or more additional reinforcement members 50 may also be integrated into the inner skin 12 at desired locations around the periphery of the inner skin 12. Upon integrating the desired number of reinforcement members 50 into the inner skin 12, a sub-assembly 10a is formed. The sub-assembly 10a is then allowed to cure in a conventional manner. The inner skin 12 and the first end segment 54 of each reinforcement member 50 may thereafter be perforated together, such as by drilling, sand blasting or other known technologies, so as to have aligned perforations 18, 58.

Turning to FIG. 4, once the sub-assembly 10a has cured and the inner skin 12 and the first end segments 54 of the reinforcement members 50 have been perforated, the core 16 is bonded to the sub-assembly 10a using a suitable adhesive. In bonding the core 16 to the sub-assembly 10a, the core 16 is bonded to the reinforcement member 50 and the inner skin 12. After the core 16 is bonded to the sub-assembly 10a, the radially innermost surface 14a of the outer skin 14 is bonded to the core 16 and the reinforcement member 50, thereby completing the barrel 10. As indicated above, the bonding techniques employed are well known to those skilled in the art.

According to an alternative embodiment, the inner skin 12, outer skin 14, cellular core 16 and reinforcement members 50 may be bonded together in one step to form the barrel 10, and the barrel 10 may thereafter be allowed to cure. The inner skin 12 and the first end segment 54 of each reinforcement member 50 may then be perforated together so as to have aligned perforations 18, 58.

Figure 6:
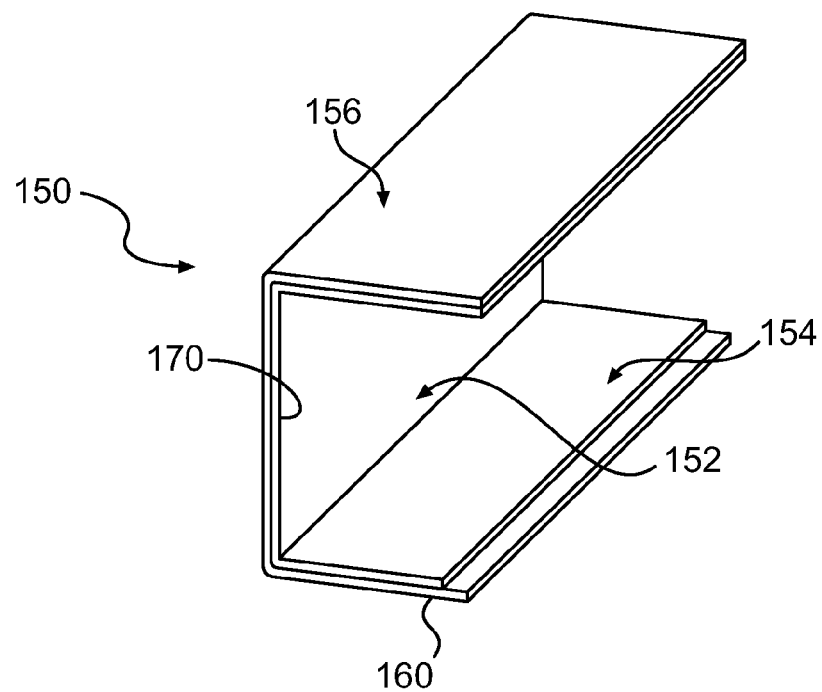
FIG. 6 is a perspective view showing a crack and delamination stopper according to another embodiment of the invention.
Figure 7:
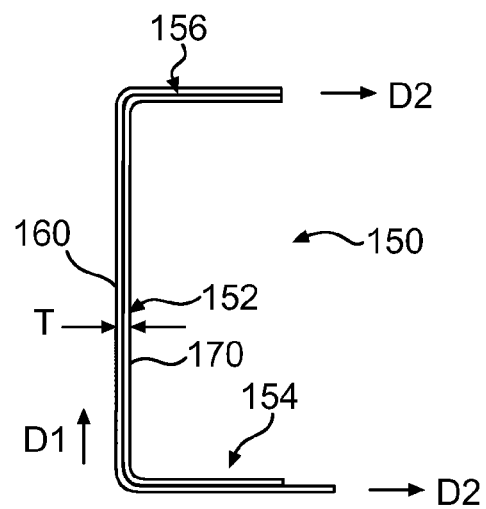
FIG. 7 is a cross-sectional view of the crack and delamination stopper of FIG. 6.

FIGS. 6 and 7 show a crack and delamination stopper or reinforcement member 150 according to another embodiment of the invention. The reinforcement member 150 may be used in place of the reinforcement member 50 shown in FIGS. 1-5. The reinforcement member 150 has an essentially C-shaped cross section in the axial direction of the barrel 10 and includes a central segment 152 extending in a first direction D1, a first end segment 154 extending from a first end of the central segment 152 in a second direction D2 transversely to the first direction D1, and a second end segment 156 extending from a second end of the central segment 152 in the second direction D2. Each reinforcement member 150 is constructed from two similarly shaped plies 160, 170 that are bonded together such that each ply 160, 170 essentially forms a half of the reinforcement member 150. As is the case with the embodiment of FIGS. 1-5, the reinforcement member 150 is provided as a pre-cured composite body.

Figure 8:
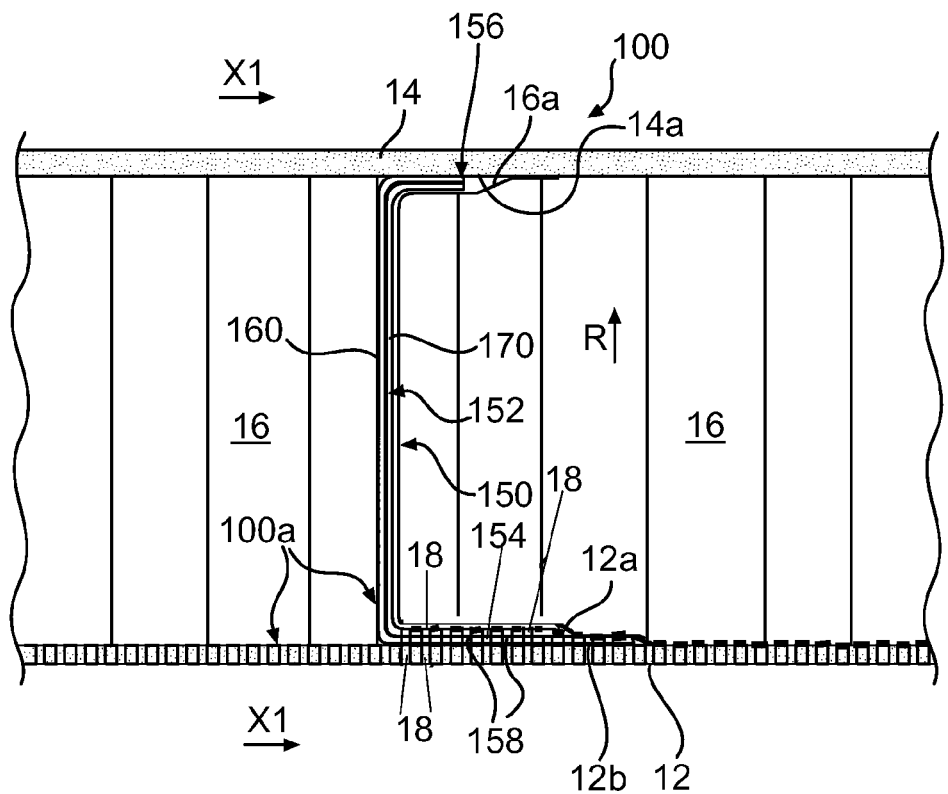
FIG. 8 is an enlarged cross-sectional view of an acoustic inner barrel including the crack and delamination stopper of FIGS. 6 and 7.

As shown in FIG. 7, the ply 160 may be longer than the ply 170 in the direction D2 at the first end segment 154 in order to promote more secure integration of the reinforcement member 150 into a barrel 100 (FIG. 8).

As is the case in the embodiment of FIGS. 1-5, the reinforcement member 150 may generally have a thickness T (in the direction perpendicular to the length of a respective portion 152/154/156) of about 0.030 to 0.050 inches (0.076-0.127 cm). However, the thickness of the reinforcement member 150 may vary based upon the requirements of a particular application. Additionally, the reinforcement member 150 may be formed from a different number of plies, the plies may be joined by means other than bonding, or the reinforcement members may have unitary one-piece construction. The axial length of the reinforcement member 150 (in the direction L shown in FIG. 1) may be approximately equal to the axial length of the core 16.

FIG. 8 shows the construction of the barrel 100 including at least one reinforcement member 150. As shown in FIG. 8, the central segment 152 of the reinforcement member 150 extends radially in the direction R through the core 16 of the barrel 100, the first end segment 154 of the reinforcement member 150 extends substantially parallel to the inner skin 12 in a first direction X1 and the second end segment 156 of the reinforcement member 150 extends substantially parallel to the outer skin 14 in the direction X1. The first end segment 154 is positioned between layers 12a, 12b of the inner skin 12. The second end segment 156 is positioned between the radially outermost surface 16a of the core 16 and the radially innermost surface 14a of the outer skin 14. The second end segment 156 may alternatively be positioned between individual layers (not shown) of the outer skin 14, in a similar fashion to the bonding of the first end segment 154 between the layers 12a, 12b of the inner skin 12. However, as is the case with the previously described barrel 10, it is preferable that the second end segment 156 not be positioned between individual layers of the outer skin 14, so that the bond between the reinforcement member 150 and the inner skin 12 is stronger than the bond between the reinforcement member 150 and the outer skin 14. Preferably, when the reinforcement member 150 is integrated into the barrel 100, the first end segment 154 of the reinforcement member 150 is provided with perforations 158 that are aligned with the perforations 18 in the inner skin 12.

The reinforcement member 150 is integrated into the inner skin 12 by positioning the first end segment 154 between the inner skin layers 12a, 12b such that the layers 12a, 12b lie over the first end segment 154, and applying adhesive to adjacent surfaces of the first end segment 154 and the inner skin layers 12a and 12b. One or more additional reinforcement members 150 may also be integrated into the inner skin 12 at desired locations around the periphery of the inner skin 12. Upon installing the desired number of reinforcement members 150 into the inner skin 12, a sub-assembly 100a including the inner skin 12 and the reinforcement members 150 is formed. The sub-assembly 100a is then allowed to cure. The inner skin 12 and the first end segment 154 of each reinforcement member 50 may thereafter be perforated together so as to have aligned perforations 18, 158. Once the sub-assembly 100a has cured and the inner skin 12 and the first end segments 154 of the reinforcement members 150 have been perforated, the core 16 is bonded to the sub-assembly 100a, and outer skin 14 is bonded to the core 16 using a suitable adhesive. In bonding the core 16 to the sub-assembly 100a, the core 16 is bonded to the reinforcement members 50 and the inner skin 12. After the core 16 is bonded to the sub-assembly 100a, the radially innermost surface 14a of the outer skin 14 is bonded to the core 16 and the reinforcement members 150, thereby completing the barrel 100.

According to an alternative embodiment, the inner skin 12, outer skin 14, cellular core 16 and reinforcement members 150 may be bonded together in one step to form the barrel 100, and the barrel 100 may thereafter be allowed to cure. The inner skin 12 and the first end segment 154 of each reinforcement member 150 may then be perforated together so as to have aligned perforations 18, 158.

Figure 9:
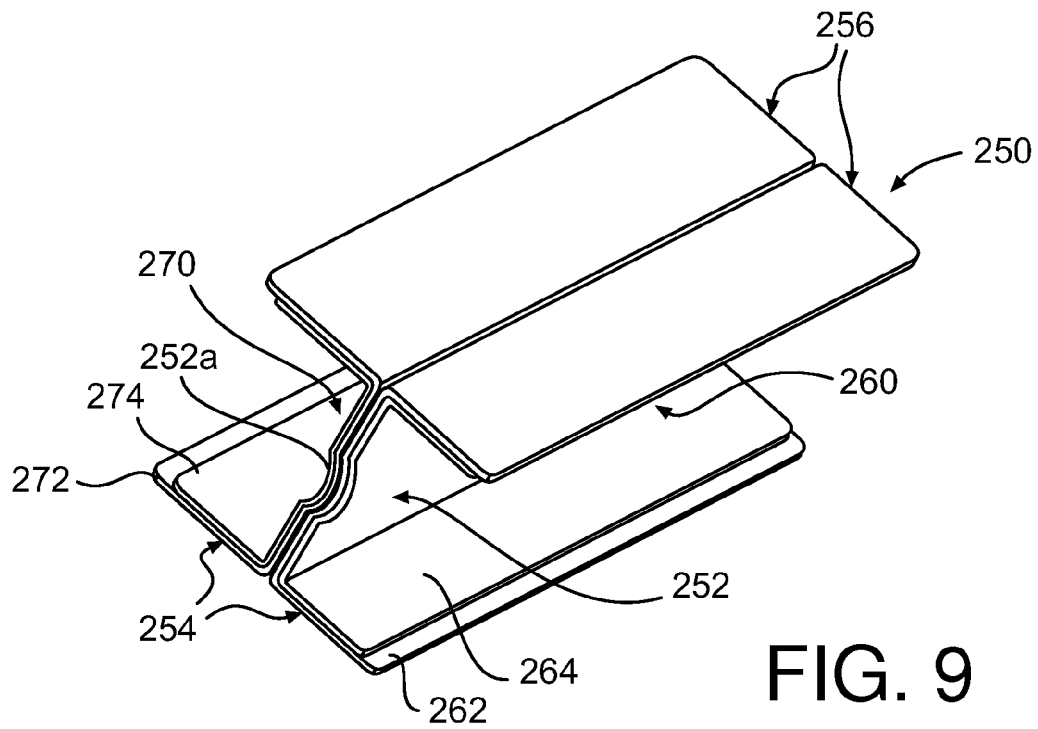
FIG. 9 is a perspective view showing a crack and delamination stopper according to yet another embodiment of the invention.
Figure 10:
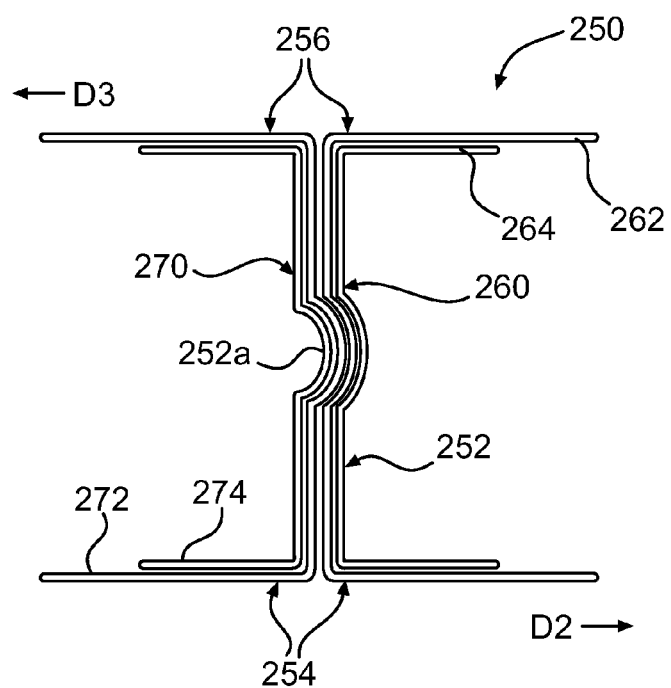
FIG. 10 is a cross-sectional view of the crack and delamination stopper of FIG. 9.

A crack and delamination stopper or reinforcement member 250 according to another embodiment is shown in FIGS. 9 and 10. When assembled from its components, the reinforcement member 250 has a substantially I-shaped cross-section in the axial direction of the barrel 200 and includes an elongate central segment 252 extending in a first direction D1, a first end segment 254 extending transversely to the central segment 252 in directions D2, D3, and a second end segment 256 extending from a second end of the central segment 252 transversely in directions D2, D3 to the central segment 252. The central segment 252 may include a bowed region 252a having an arcuate cross-section.

According to a preferred embodiment, the reinforcement member 250 is provided as a pre-cured composite body constructed of graphite-epoxy or the like. As shown in FIGS. 9 and 10, the reinforcement member 250 is constructed of a first substantially C-shaped member 260 and a second substantially C-shaped member 270 joined together in back-to-back relationship. The first substantially C-shaped member 260 is formed from two similarly shaped plies 262, 264 that are bonded together. Similarly, the second substantially C-shaped member 270 is formed from two similarly shaped plies 272, 274 that are bonded together. In order to promote more secure bonding within the barrel 200, the plies 262, 272 extend further in the directions D2, D3 than the plies 264, 274. The bowed region 252a is formed from bowed regions in the plies 262, 264 and 272, 274 that assist in alignment of the plies.

Figure 11:
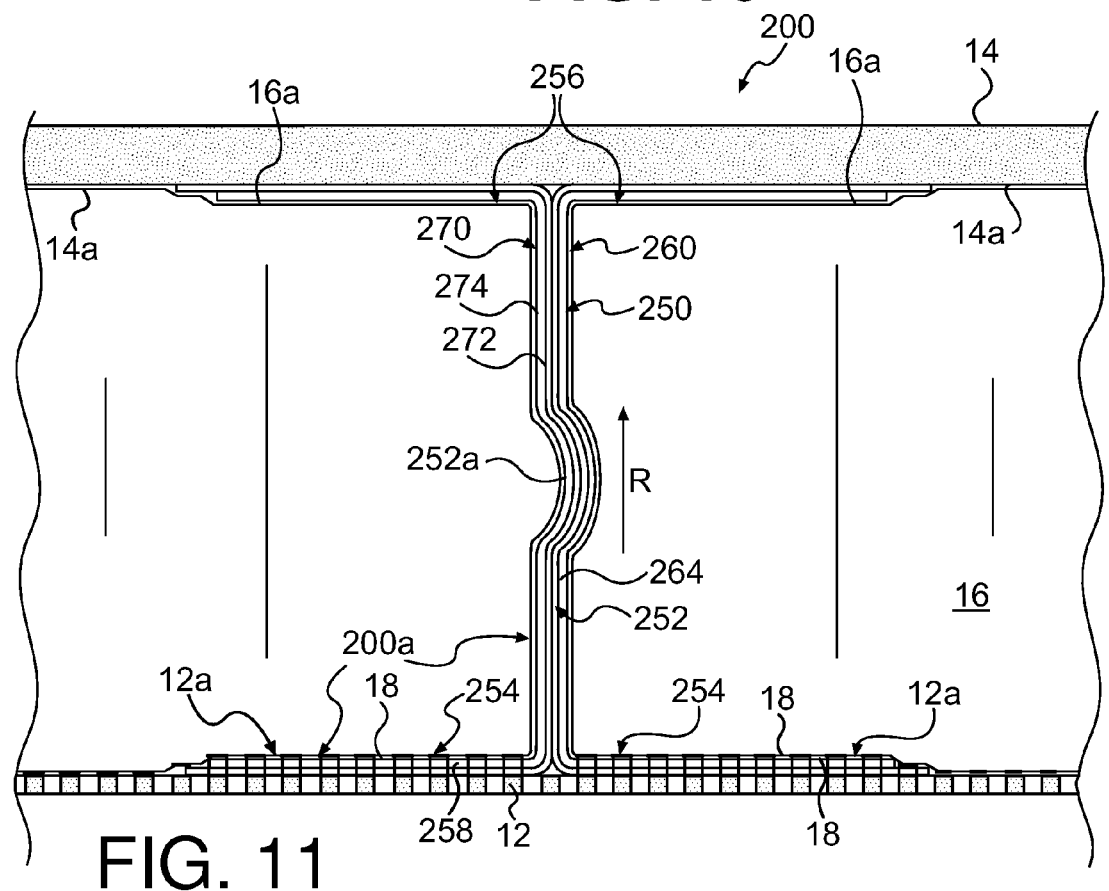
FIG. 11 is an enlarged cross-sectional view showing an acoustic inner barrel including the crack and delamination stopper of FIG. 9.

Referring to FIG. 11, the end segments 254, 256 may generally have a thickness T (in the direction perpendicular to the length of the respective segment 254/256) of about 0.5 inches (1.27 cm), while the central segment 252 may have a thickness T2 (in the direction perpendicular to the length of the segment 252) of about 1 inch (2.54 cm). However, the thickness of the reinforcement member 250 may vary as required. The axial length of the reinforcement member 250 (in the direction L shown in FIG. 1) may be approximately equal to the axial length of the core 16.

As is the case with the preceding embodiments, it should be understood that the reinforcement member 250 may have a different number of multiple plies, the plies may be joined by means other than bonding, or the reinforcement member may have unitary one-piece construction.

FIG. 11 illustrates the construction of the barrel 200 including the reinforcement member 250. As shown in FIG. 11, the central segment 252 of the reinforcement member 250 extends radially in the direction R through the core 16 of the barrel 200, the first end segment 254 of the reinforcement member 250 extends substantially parallel to the inner skin 12 in directions X1, X2 and the second end segment 256 of the channel member 50 extends substantially parallel to the outer skin 14 in directions X1, X2. The first end segment 254 is positioned between opposing layers 12a, 12b of the inner skin 12, and the second end segment 256 is positioned between the radially innermost surface 14a of the outer skin 14 and the radially outermost surface 16a of the core 16. Optionally, the second end portion 256 of the reinforcement member 250 may be positioned between individual layers (not shown) of the outer skin 14. As in the previously discussed barrels 10, 100, it is less preferable to position the second end portion 256 between individual layers of the outer skin 14, as it is desirable that the bond between the reinforcement member 250 and the inner skin 12 be stronger than the bond between the reinforcement member 250 and the outer skin 14. When the reinforcement member 250 is integrated into the barrel 200, the first end segment 254 of the reinforcement member 250 is preferably provided with perforations 258 that are substantially aligned with the perforations 18 in the inner skin 12.

The reinforcement member 250 is integrated into the inner skin 12 by positioning the first end segment 254 between the inner skin layers 12a, 12b such that the layers 12a, 12b lie over the first end segment 254, and applying adhesive to adjacent surfaces of the first end segment 254 and the inner skin layers 12a, 12b. One or more additional reinforcement members 250 may also be integrated into the inner skin 12 at desired locations around the periphery of the inner skin 12. Upon installing the desired number of reinforcement members 250 into the inner skin 12, a sub-assembly 200a including the inner skin 12 and the reinforcement members 250 is formed. The sub-assembly 200a is then allowed to cure. The inner skin 12 and the first end segment 254 of each reinforcement member 250 may then be perforated together so as to have aligned perforations 18, 258. Once the sub-assembly 200a has cured, and the inner skin 12 and the first end segments 254 of the reinforcement members 250 have been perforated, the core 16 is bonded to the sub-assembly 200a. In bonding the core 16 to the sub-assembly 200a, the core 16 is bonded to the reinforcement members 250 and the inner skin 12. After the core 16 is bonded to the sub-assembly 200a, the radially innermost surface 14a of the outer skin 14 is bonded to the core 16 and the reinforcement members 250.

According to an alternative embodiment, the inner skin 12, outer skin 14, cellular core 16 and reinforcement members 250 may be bonded together in one step to form the barrel 200, and the barrel 200 may thereafter be allowed to cure. The inner skin 12 and the first end segment 254 of each reinforcement member 250 may then be perforated together so as to have aligned perforations 18, 258.

The reinforcement members and 360-degree, one-piece acoustic inner barrels disclosed herein improve the fly-home capability of aircraft during blade-out events and other events that inflict damage on an acoustic inner barrel of an aircraft engine nacelle. During a blade-out event or another accident causing a severe impact on the acoustic inner barrel, the disclosed reinforcement members function to limit crack propagation and delamination in the acoustic inner barrel and nacelle. Due to their design and orientation in the acoustic inner barrel, the reinforcement members also do not significantly affect the sound dampening performance of the acoustic inner barrel.

The foregoing disclosure provides illustrative embodiments of the invention and is not intended to be limiting. It should be understood that modifications of the disclosed embodiments are possible within the spirit and scope of the invention, and the invention should be construed to encompass such modifications.

We claim:

1. An acoustic inner barrel for an engine nacelle inlet, the acoustic barrel comprising:
   an annular inner skin;
   an annular outer skin;
   an annular acoustic cellular core disposed between the inner skin and the outer skin; and
   at least two reinforcement members extending radially from the inner skin, through the acoustic cellular core, and to the outer skin, wherein the inner skin, outer skin, acoustic cellular core and the at least two reinforcement members are bonded together to form a 360-degree, one-piece annular structure, wherein each reinforcement member comprises:

a central segment extending radially through the acoustic cellular core;

a first end segment extending from a first end of the central segment substantially parallel to the inner skin, the first end segment being positioned between layers of the inner skin; and a second end segment extending from a second end of the central segment substantially parallel to the outer skin, the second end segment being positioned between the acoustic cellular core and the outer skin.

2. The acoustic inner barrel of claim 1, wherein each of the inner skin, the outer skin, the cellular core and the at least two reinforcement members is constructed from a graphite composite material.

3. The acoustic inner barrel of claim 1, wherein perforations are formed in both the first end segment and the inner skin, and the perforations in the first end segment are substantially aligned with the perforations in the inner skin.

4. The acoustic inner barrel of claim 1, wherein each reinforcement member comprises at least two similarly shaped plies that are joined to one another.

5. The acoustic inner barrel of claim 4, wherein one of the at least two similarly shaped plies is longer than the other of the at least two similarly shaped plies at the first end segment.

6. The acoustic inner barrel of claim 1, wherein each reinforcement member has a cross section in an axial direction of the barrel, the cross section having a shape selected from the group consisting of: substantially Z-shaped, substantially C-shaped and substantially I-shaped.

7. The acoustic inner barrel of claim 1, wherein each reinforcement member comprises a first substantially C-shaped member joined to a second substantially C-shaped member in back-to-back relationship.

8. The acoustic inner barrel of claim 7, wherein the first substantially C-shaped member and the second substantially C-shaped member are each constructed from at least two similarly shaped plies that are joined to one another.

9. The acoustic inner barrel of claim 7, wherein the first substantially C-shaped member and the second substantially C-shaped member each comprise a central segment extending transversely through the cellular core, the central segment comprising a bowed region having an arcuate cross-section in an axial direction of the barrel.

10. A method of forming an acoustic inner barrel for an aircraft engine nacelle inlet, the method comprising:

providing an annular inner skin comprising a plurality of layers, an annular outer skin, a cellular core, and at least two reinforcement members, wherein each reinforcement member comprises a central segment, a first end segment extending transversely to the central segment and a second end segment extending transversely to the central segment;

positioning the first end segment between at least two layers of the inner skin such that the first end segment extends substantially parallel to the inner skin;

bonding the at least two reinforcement members to the inner skin;

bonding the cellular core to the at least two reinforcement members and the inner skin such that the at least two reinforcement members extend transversely through the cellular core;

positioning the second end segment between the cellular core and the outer skin, such that the second end segment extends substantially parallel to the outer skin; and bonding the outer skin to the cellular core and the at least two reinforcement members.

11. The method of claim 10, wherein each of the inner skin, the outer skin, the cellular core and the at least two reinforcement members is constructed from a graphite composite material.

12. The method of claim 10, comprising perforating the inner skin and the first end segment together after bonding the at least two reinforcement members to the inner skin.

13. The method of claim 10, comprising providing reinforcement members having a cross section in an axial direction of the barrel, the cross section having a shape selected from the group consisting of: substantially Z-shaped, substantially C-shaped and substantially I-shaped.

* * * * *